US009894647B2

(12) United States Patent
Chen et al.

(10) Patent No.: US 9,894,647 B2
(45) Date of Patent: Feb. 13, 2018

(54) DOWNLINK COVERAGE ENHANCEMENTS

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/494,457

(22) Filed: Apr. 22, 2017

(65) Prior Publication Data
US 2017/0230948 A1 Aug. 10, 2017

Related U.S. Application Data

(63) Continuation of application No. 13/765,274, filed on Feb. 12, 2013, now Pat. No. 9,635,644.
(Continued)

(51) Int. Cl.
*H04L 5/14* (2006.01)
*G01R 31/08* (2006.01)
(Continued)

(52) U.S. Cl.
CPC ......... *H04W 72/042* (2013.01); *H04L 1/1812* (2013.01); *H04L 5/0044* (2013.01);
(Continued)

(58) Field of Classification Search
CPC ........... H04W 72/042; H04W 72/0446; H04W 24/02; H04W 84/045; H04L 5/004
See application file for complete search history.

(56) References Cited

U.S. PATENT DOCUMENTS

| | | | |
|---|---|---|---|
| 7,076,250 B2 | 7/2006 | Gustafsson | |
| 8,537,862 B2 * | 9/2013 | Blankenship | H04L 5/0053 370/252 |

(Continued)

FOREIGN PATENT DOCUMENTS

| | | |
|---|---|---|
| CN | 101689927 A | 3/2010 |
| CN | 101841348 A | 9/2010 |

(Continued)

OTHER PUBLICATIONS

Ericsson, et al., "Reduction of Supported Downlink Transmission Modes for Low-Cost MTC", 3GPP TSG RAN WG1 Meeting #69, R1-122010, May 2012, 2 pages.
(Continued)

*Primary Examiner* — Brian Roberts
*Assistant Examiner* — Abu-Sayeed Haque
(74) *Attorney, Agent, or Firm* — Patterson & Sheridan, LLP

(57) ABSTRACT

Aspects of the present disclosure provide techniques and apparatus for enhancing downlink coverage for certain user equipments (UEs) (e.g., low cost, low data rate UEs). Certain types of UEs may have limited coverage or should receive enhanced coverage relative to other types of UEs. For example, some types of low cost UEs may have only a single receive chain, thereby limiting DL coverage, while other types of UEs benefit from multiple receive chains. One example method generally includes identifying a first type of one or more UEs that is to receive enhanced downlink (DL) coverage relative to a second type of UEs and utilizing one or more DL coverage enhancement techniques when communicating with the first type of UEs, the one or more DL coverage enhancement techniques designed to adjust at least for reduced DL processing gain of the first type of UEs relative to the second type of UEs.

59 Claims, 6 Drawing Sheets

Related U.S. Application Data

(60) Provisional application No. 61/681,902, filed on Aug. 10, 2012.

(51) Int. Cl.

| | | |
|---|---|---|
| *H04B 7/00* | (2006.01) | |
| *H04J 3/00* | (2006.01) | |
| *H04W 72/04* | (2009.01) | |
| *H04L 5/00* | (2006.01) | |
| *H04L 1/18* | (2006.01) | |
| *H04W 24/02* | (2009.01) | |
| *H04W 84/14* | (2009.01) | |
| *H04W 84/04* | (2009.01) | |

(52) U.S. Cl.
CPC .......... *H04L 5/0053* (2013.01); *H04W 24/02* (2013.01); *H04W 72/0446* (2013.01); *H04W 84/045* (2013.01); *H04W 84/14* (2013.01)

(56) References Cited

U.S. PATENT DOCUMENTS

| | | |
|---|---|---|
| 2006/0285503 A1 | 12/2006 | Mese et al. |
| 2007/0025325 A1 | 2/2007 | Kumar |
| 2008/0085718 A1 | 4/2008 | Kuchibhotla et al. |
| 2008/0273479 A1 | 11/2008 | Kwak et al. |
| 2009/0276674 A1 | 11/2009 | Wei et al. |
| 2010/0008348 A1 | 1/2010 | Zhang et al. |
| 2010/0067445 A1 | 3/2010 | Rinne et al. |
| 2010/0075683 A1 | 3/2010 | Johansson et al. |
| 2010/0184444 A1 | 7/2010 | Suo et al. |
| 2010/0220623 A1 | 9/2010 | Cave et al. |
| 2010/0234063 A1 | 9/2010 | Mueck et al. |
| 2010/0272046 A1 | 10/2010 | Guo |
| 2011/0044277 A1 | 2/2011 | Moulsley et al. |
| 2011/0105110 A1 | 5/2011 | Carmon et al. |
| 2011/0164707 A1 | 7/2011 | Luo et al. |
| 2011/0194527 A1 | 8/2011 | Lin et al. |
| 2011/0292916 A1 | 12/2011 | Shirakabe et al. |
| 2011/0299446 A1* | 12/2011 | Chun ................. H04W 36/04 370/311 |
| 2012/0052897 A1 | 3/2012 | Senarath et al. |
| 2012/0106407 A1 | 5/2012 | Papasakellariou et al. |
| 2012/0147815 A1 | 6/2012 | Meyer et al. |
| 2012/0176951 A1* | 7/2012 | Pradas ................. H04W 74/08 370/312 |
| 2012/0281670 A1 | 11/2012 | Tiirola et al. |
| 2012/0314588 A1 | 12/2012 | Nammi |
| 2012/0320846 A1 | 12/2012 | Papasakellariou et al. |
| 2013/0003663 A1 | 1/2013 | Blankenship et al. |
| 2013/0039291 A1 | 2/2013 | Blankenship et al. |
| 2013/0039297 A1 | 2/2013 | Wang |
| 2013/0044692 A1 | 2/2013 | Nory et al. |
| 2013/0051214 A1 | 2/2013 | Fong et al. |
| 2013/0072140 A1 | 3/2013 | Li et al. |
| 2013/0100918 A1 | 4/2013 | Hong et al. |
| 2013/0114472 A1 | 5/2013 | Tamaki et al. |
| 2013/0157672 A1* | 6/2013 | Chou ................. H04W 72/082 455/450 |
| 2013/0194980 A1 | 8/2013 | Yin et al. |
| 2013/0195070 A1 | 8/2013 | Bashar et al. |
| 2013/0196701 A1* | 8/2013 | Tiirola ................. H04J 11/0026 455/501 |
| 2013/0223352 A1 | 8/2013 | Sartori et al. |
| 2013/0225184 A1 | 8/2013 | Liu et al. |
| 2013/0242880 A1 | 9/2013 | Miao et al. |
| 2013/0301608 A1 | 11/2013 | Frenne et al. |
| 2013/0329701 A1 | 12/2013 | Bajzec et al. |
| 2014/0036789 A1 | 2/2014 | Miao et al. |
| 2014/0044056 A1 | 2/2014 | Chen et al. |
| 2014/0064133 A1* | 3/2014 | Kazmi ................. H04W 24/10 370/252 |
| 2014/0071952 A1* | 3/2014 | Kim ................. H04L 5/001 370/335 |
| 2014/0247775 A1* | 9/2014 | Frenne ................. H04L 5/0048 370/329 |

FOREIGN PATENT DOCUMENTS

| | | |
|---|---|---|
| CN | 102138296 A | 7/2011 |
| WO | WO-2011000441 A1 | 1/2011 |
| WO | 2011054368 A1 | 5/2011 |
| WO | WO-2011123809 A1 | 10/2011 |

OTHER PUBLICATIONS

Ericsson et al: "On TTI bundling enhancements", 3GPP Draft; R1-122013, 3rd Generation Partnership Project (3GPP), Mobile Competence Centre ; 650, Route Des Lucioles ; F06921 Sophia-Antipolis Cedex; France, vol. RAN WG1, no. Prague, Czech Republic; May 21, 2012-May 25, 2012, May 12, 2012 (May 12, 2012), XP050600305, [retrieved on May 12, 2012].

International Search Report and Written Opinion—PCT/US2013/025867—ISA/EPO—Jun. 4, 2013.

Mediatek Inc: "Coverage Analysis of Downlink Control Channel and Enhancement Techniques for MTC UEs", 3GPP TSG RAN WG1 Meeting #72, R1-130221, Jan. 2013, 7 pages.

Vodafone Group: "Update to 3GPP TR 36.888 to include agreements from RAN1#69", 3GPP TSG RAN WG1 Meeting #69, R1-123075, May 2012, 3 pages.

ZTE Corporation: "Evaluation/analysis of single receive RF chain and Text Proposal" 3GPP Draft; R1-121067, 3rd Generation Partnership Project (3GPP). Mobile Competence Centre 650, Route Des Lucioles F-06921 Sophia-Antipolis Cedex France vol. RAN WG1. no. Jeju, Korea; Mar. 26, 2012-Mar. 30, 2012, Mar. 20, 2012 (Mar. 20, 2012), XP050099370, [retrieved on Mar. 20, 2012].

* cited by examiner

DOWNLINK COVERAGE ENHANCEMENTS

CROSS-REFERENCE TO RELATED APPLICATIONS

This application is a continuation of U.S. patent application Ser. No. 13/765,274, filed Feb. 12, 2013, which claims benefit of U.S. Provisional Patent Application Ser. No. 61/681,902, entitled "Downlink Coverage Enhancements" and filed Aug. 10, 2012, which are herein incorporated by reference.

BACKGROUND

I. Field

Certain aspects of the present disclosure generally relate to wireless communications and, more particularly, to techniques and apparatus for increasing downlink (DL) coverage to certain types of user equipments (UEs).

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

Certain aspects of the present disclosure generally relate to enhancing downlink coverage for certain types of user equipment (UE) (e.g., low cost, low data rate UEs).

Certain aspects of the present disclosure provide a method for wireless communications by a base station. The method generally includes identifying a first type of one or more UEs that is to receive enhanced downlink (DL) coverage relative to a second type of UEs and utilizing one or more DL coverage enhancement techniques when communicating with the first type of UEs, the one or more DL coverage enhancement techniques designed to adjust at least for reduced DL processing gain of the first type of UEs relative to the second type of UEs.

Certain aspects of the present disclosure provide an apparatus for wireless communications. The apparatus generally includes means for identifying a first type of one or more UEs that is to receive enhanced DL coverage relative to a second type of UEs and means for utilizing one or more DL coverage enhancement techniques when communicating with the first type of UEs, the one or more DL coverage enhancement techniques designed to adjust at least for reduced DL processing gain of the first type of UEs relative to the second type of UEs.

Certain aspects of the present disclosure provide an apparatus for wireless communications. The apparatus generally includes at least one processor and a memory coupled to the at least one processor. The at least one processor is typically configured to identify a first type of one or more UEs that is to receive enhanced DL coverage relative to a second type of UEs and to utilize one or more DL coverage enhancement techniques when communicating with the first type of UEs, the one or more DL coverage enhancement techniques designed to adjust at least for reduced DL processing gain of the first type of UEs relative to the second type of UEs.

Certain aspects of the present disclosure provide a computer program product for wireless communications. The computer program product typically includes a computer-readable medium having instructions stored thereon. The instructions are generally executable by one or more processors for identifying a first type of one or more UEs that is to receive enhanced DL coverage relative to a second type of UEs and for utilizing one or more DL coverage enhancement techniques when communicating with the first type of UEs, the one or more DL coverage enhancement techniques designed to adjust at least for reduced DL processing gain of the first type of UEs relative to the second type of UEs.

Certain aspects of the present disclosure provide a method for wireless communications by a UE. The method generally includes receiving, by the UE which is of a first type of UEs that is to receive enhanced DL coverage relative to a second type of UEs, information regarding one or more DL coverage enhancement techniques utilized by a base station when communicating with the UE to adjust at least for reduced DL processing gain of the first type of UEs relative to the second type of UEs; and receiving one or more downlink transmissions from the base station, transmitted utilizing the one or more DL coverage enhancement techniques. For certain aspects, the method further includes processing the one or more downlink transmissions based on the received information.

Certain aspects of the present disclosure provide an apparatus for wireless communications. The apparatus generally includes means for receiving, by the apparatus which is of a first type of UEs that is to receive enhanced DL coverage relative to a second type of UEs, information regarding one or more DL coverage enhancement techniques utilized by a base station when communicating with the apparatus to adjust at least for reduced DL processing gain of the first type of UEs relative to the second type of UEs; and means for receiving one or more downlink transmissions from the base station, transmitted utilizing the one or more DL coverage enhancement techniques.

Certain aspects of the present disclosure provide an apparatus for wireless communications. The apparatus generally includes at least one processor and a memory coupled to the at least one processor. The at least one processor is configured to receive, by the apparatus which is of a first type of UEs that is to receive enhanced DL coverage relative to a second type of UEs, information regarding one or more DL coverage enhancement techniques utilized by a base station when communicating with the apparatus to adjust at least for reduced DL processing gain of the first type of UEs relative to the second type of UEs; and to receive one or more downlink transmissions from the base station, transmitted utilizing the one or more DL coverage enhancement techniques.

Certain aspects of the present disclosure provide a computer program product for wireless communications. The computer program product typically includes a computer-readable medium having instructions stored thereon, the instructions executable by one or more processors for receiving, by a UE which is of a first type of UEs that is to receive enhanced DL coverage relative to a second type of UEs, information regarding one or more DL coverage enhancement techniques utilized by a base station when communicating with the UE to adjust at least for reduced DL processing gain of the first type of UEs relative to the second type of UEs; and for receiving one or more downlink transmissions from the base station, transmitted utilizing the one or more DL coverage enhancement techniques.

DETAILED DESCRIPTION

Aspects of the present disclosure provide techniques and apparatus for enhancing downlink coverage for certain user equipments (e.g., low cost, low data rate UEs).

For some systems, certain types of UEs may have limited coverage or, for some reason, should receive enhanced coverage relative to other types of UEs. For example, some types of low cost UEs may have only a single receive chain, thereby limiting DL coverage, while other types of UEs benefit from multiple receive chains. Further, transmit power on a downlink may be limited, and/or a relatively narrow bandwidth may be used to communicate with these types of UEs, reducing frequency diversity gains.

Techniques presented herein, however, may help enhance DL coverage to such UEs.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

AN EXAMPLE WIRELESS COMMUNICATION SYSTEM

Figure 1:
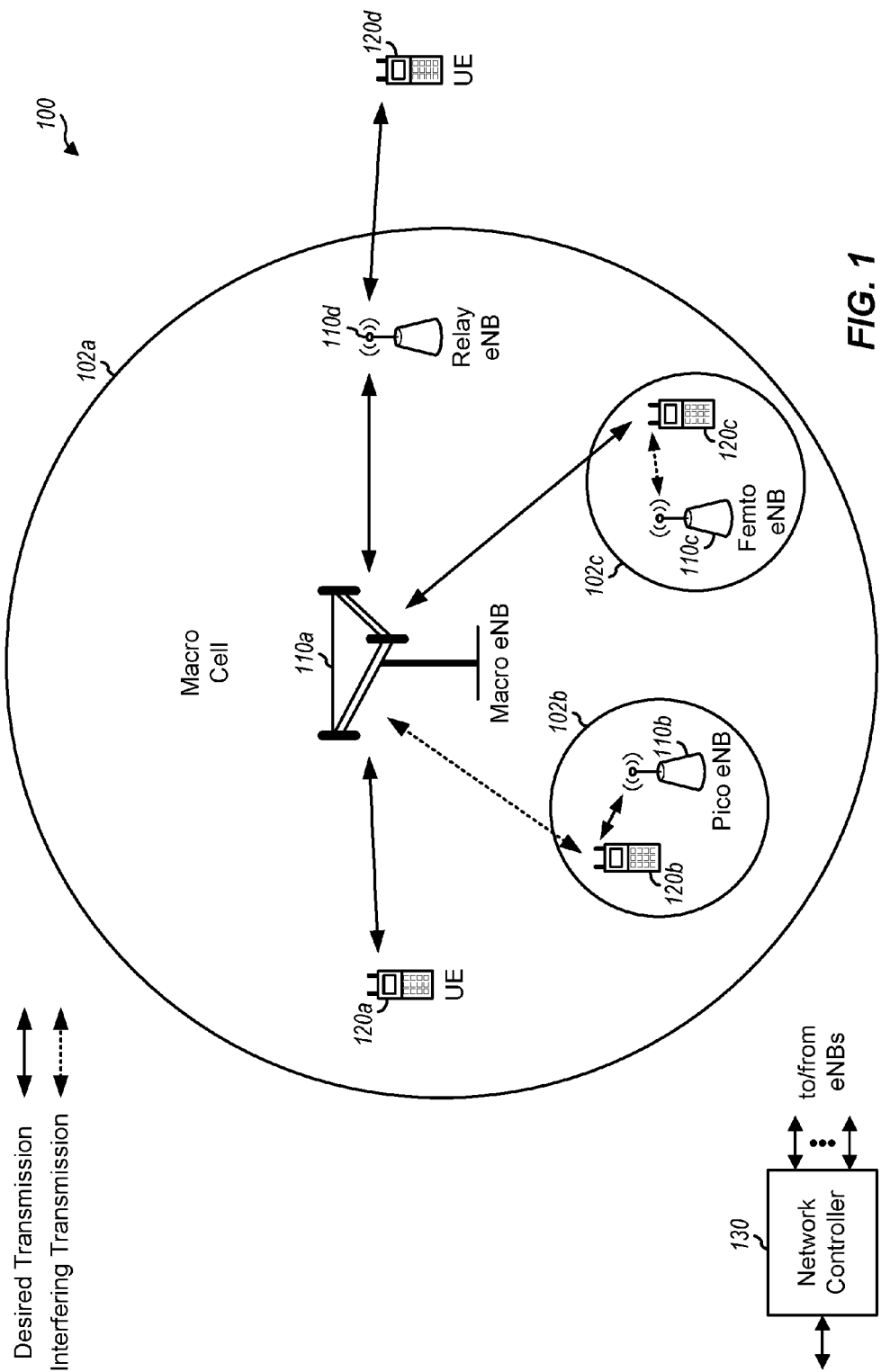
FIG. 1 is a block diagram conceptually illustrating an example wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110*a* and UE 120*d*. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, etc.

Figure 2:
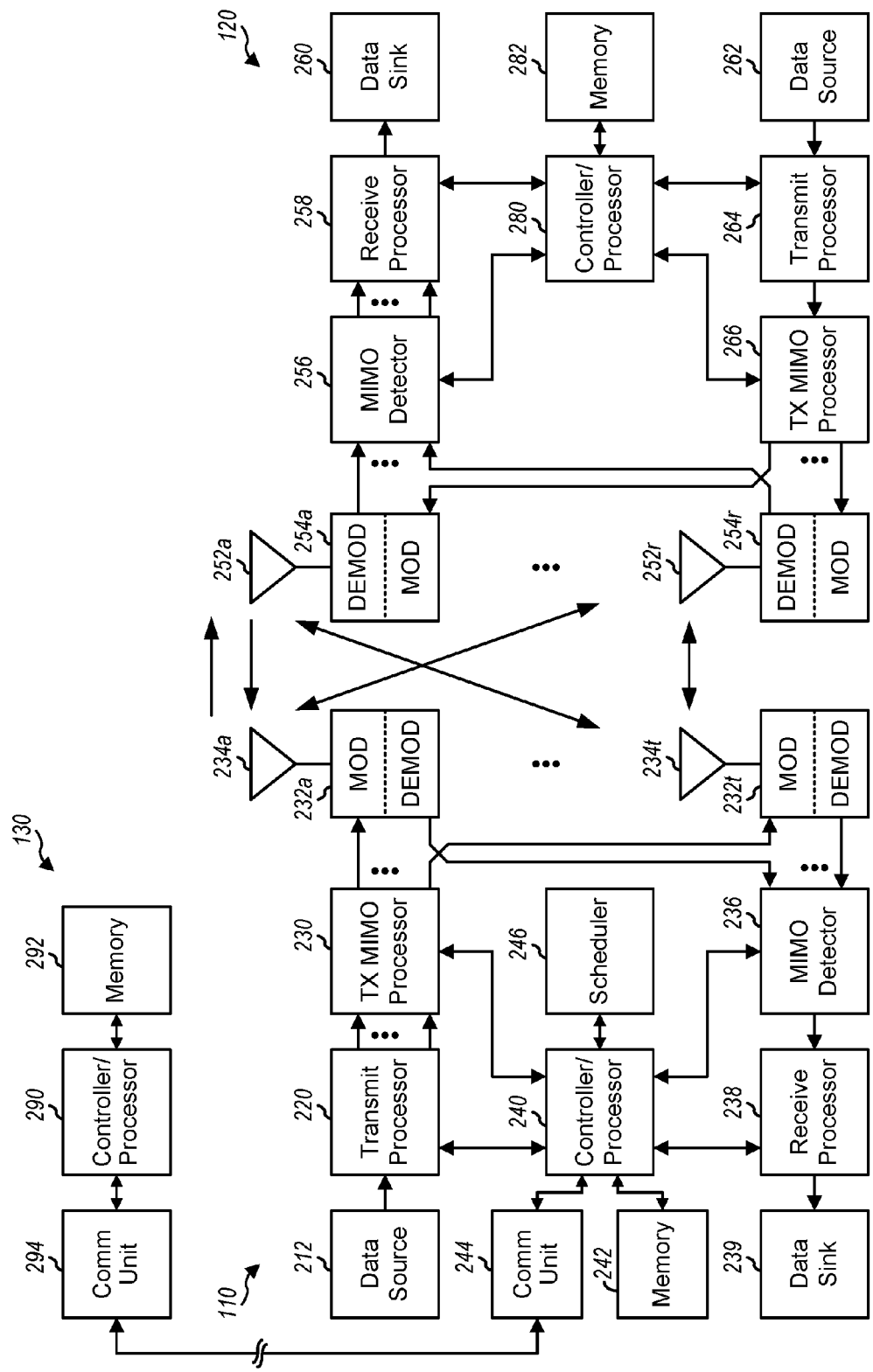
FIG. 2 is a block diagram conceptually illustrating an example of an evolved node B (eNB) in communication with a user equipment (UE) in a wireless communications network, in accordance with certain aspects of the present disclosure.

FIG. 2 is a block diagram of a design of base station/eNB 110 and UE 120, which may be one of the base stations/eNBs and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254*a* through 254*r* (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals (RSs) such as UE-RS and/or data in the resource blocks may be precoded using the same precoder. The power level used for the UE-RS in each resource block (RB) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous RBs, wherein at least one reference signal in resource blocks in each bundle are precoded with a common precoding matrix, estimate at least one precoded channel based on the determined bundling size and one or more RSs transmitted from the base station, and decode the received bundles using the estimated precoded channel.

Figure 3:
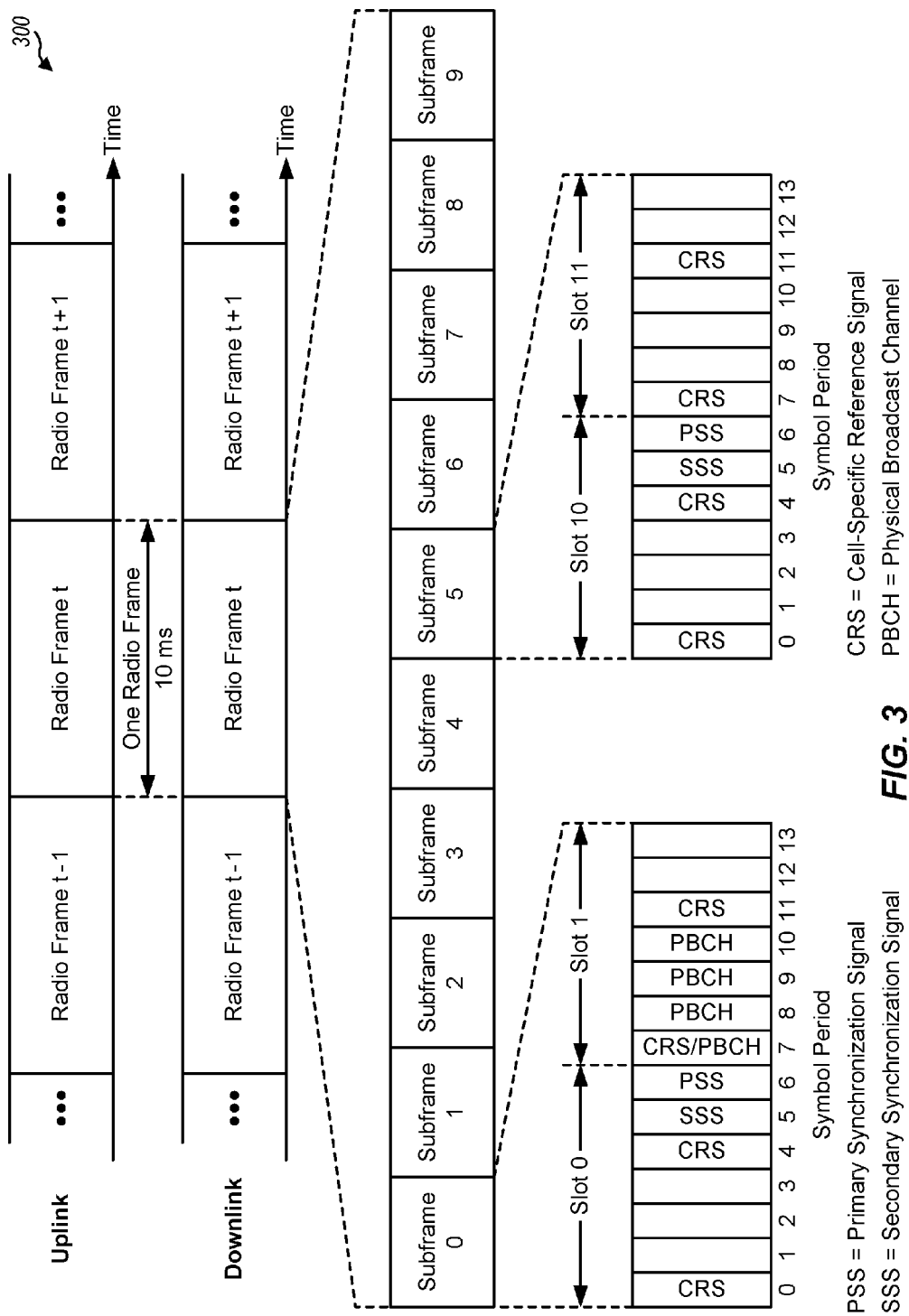
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
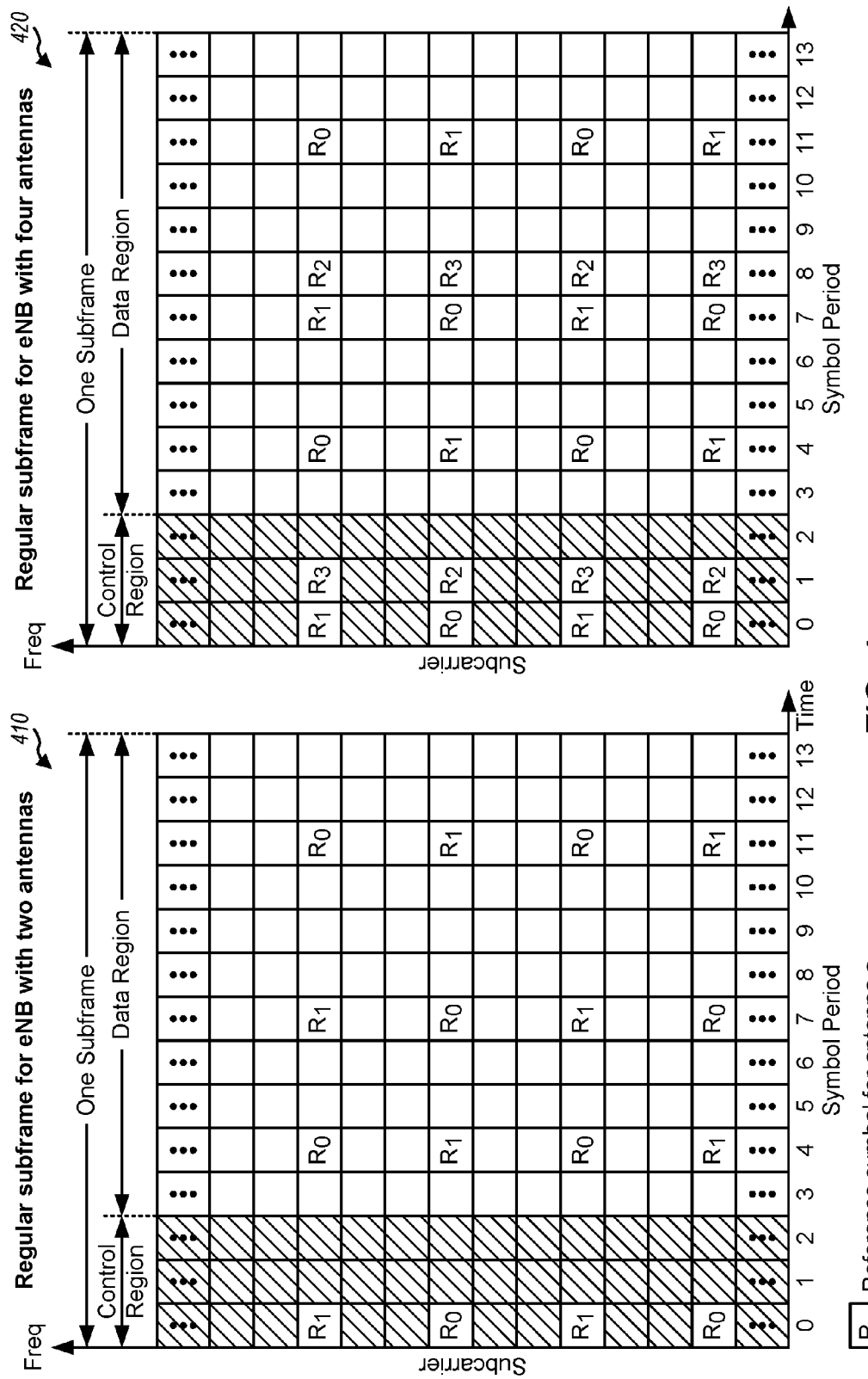
FIG. 4 illustrates two example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

Downlink Coverage Issues

According to certain wireless communication systems (e.g., in LTE Rel-8/9/10), PDCCH is located in the first few symbols in a subframe. With these systems, PDCCH may be fully distributed in the entire system bandwidth. In addition, PDCCH may be time-division multiplexed (TDM'd) with PDSCH. In this manner, a subframe is effectively divided into a control region and a data region In certain systems, a new control channel (e.g., enhanced PDCCH or ePDCCH) may be introduced. Unlike a conventional or "legacy" PDCCH, which occupies the first several control symbols in a subframe, ePDCCH may occupy the data region, similar to PDSCH. ePDCCH may increase control channel capacity, support frequency-domain inter-cell interference coordination (ICIC), achieve improved spatial reuse of control channel resources, support beamforming and/or diversity, operate on the new carrier type (NCT) and in Multimedia Broadcast Single Frequency Network (MBSFN) subframes, and coexist on the same carrier as legacy UEs.

One of the main focuses of traditional LTE design is on the improvement of spectral efficiency, ubiquitous coverage, enhanced Quality of Service (QoS) support, and the like. This typically results in high-end devices, such as state-of-art smartphones, tablets, and other such devices.

However, it may also be desirable to support low cost, low data rate devices (e.g., in accordance with LTE Rel-11), as well. Some market projections show that the number of low cost devices may largely exceed today's cell phones. Various design aspects may be employed to design such low cost, low rate devices, such as reduction of maximum bandwidth, use of a single receive radio frequency (RF) chain, reduction of peak rate, reduction of transmit power, and half duplex operation.

In general, since the intended data rate for the low cost device may be significantly lower than conventional devices (e.g., less than 100 kbps), it is possible to operate the low cost device only at narrow bandwidth to reduce the cost. There are generally two operation scenarios under consideration. One straightforward deployment scenario is to set aside some narrow bandwidth (e.g. 1.25 MHz) to support the machine type communications (MTC) operations. No standard changes are involved for such operations.

A second, possibly more interesting deployment scenario may be to operate low cost UEs in a large bandwidth, such that low cost UEs may coexist with regular UEs. There are at least two possible operations for low cost UEs in a large bandwidth. First, low cost UEs may still operate with the same large bandwidth (e.g., up to 20 MHz) as regular UEs. This need not involve change to existing standards, but may not be helpful in reducing cost and battery power consumption. Second, low cost UEs may operate with a smaller bandwidth (within a larger bandwidth).

In certain systems (e.g., LTE Rel-8/9/10), transmission time interval (TTI) or subframe bundling may be configured on a per-UE basis. The subframe bundling operation may be configured, for example, by the parameter "ttiBundling" provided by higher layers. If TTI bundling is configured for a UE, the subframe bundling operation may only be applied to the Uplink Shared Channel (UL-SCH) (and not be applied to other UL signals/traffic, such as uplink control information). The bundling size may be fixed (e.g., at 4 subframes). That is, the Physical Uplink Shared Channel (PUSCH) may be transmitted in 4 consecutive subframes, and the same hybrid automatic repeat request (HARQ) process number may be used in each of the bundled subframes. The resource allocation size may be restricted (e.g., to up to 3 RBs) and the modulation order may be fixed (e.g., set to 2 with quadrature phase-shift keying (QPSK)). A bundle may be treated as a single resource (e.g., a single grant and a single HARQ acknowledgement (ACK) may be used for each bundle).

While TTI bundling is used mainly for low rate traffic, there are other motives for implementing TTI bundling. Although segmentation is one alternative to TTI bundling, there are disadvantages. For example, if voice over Internet protocol (VoIP) packets cannot be transmitted in a single TTI due to a low UL link budget, Layer 2 (L2) segmentation may be applied. For example, a VoIP packet may be segmented in 4 radio link control (RLC) protocol data units (PDUs) that are transmitted in 4 consecutive TTIs and 2-3 HARQ retransmissions might be targeted to achieve sufficient coverage. This approach has various drawbacks. For example, each additional segment introduces a 1 byte RLC, a 1 byte media access control (MAC), and a 3 byte Layer 1 (L1) cyclic redundancy check (CRC) overhead (i.e., 15% overhead assuming a 33 byte RLC service data unit (SDU) size). This means that for 4 segments, there is an additional L1/L2 overhead of 45%. HARQ transmissions/retransmissions for every segment may entail grants on PDCCH, consuming significant PDCCH resources. Each HARQ transmission or retransmission is followed by HARQ feedback on the Physical HARQ Indicator Channel (PHICH). Assuming a negative ACK (NACK)-to-ACK error ratio of $10^{-3}$, the large number of HARQ feedback signals leads to high packet loss probabilities. For example, if 12 HARQ feedback signals are sent, the HARQ feedback error ratio might be on the order of $1.2*10^{-2}$. Packet loss rates of more than $10^{-2}$ are generally unacceptable for VoIP traffic.

Furthermore, usage of only a single uplink grant and a single PHICH signal per TTI bundle may be advantageous. Also, the L1 and L2 overhead may be minimized since L2 segmentation need not be applied.

TTI bundling may also prove useful for UL coverage enhancements. For example, it may be desirable to increase coverage for medium data rate PUSCH and UL VoIP. The minimum gain for consideration of specifying the potential solution is 1 dB for both medium data rate PUSCH and UL VoIP. Potential solutions include TTI bundling enhancements for medium data rate and VoIP. For this solution, both L1 (and higher layers') protocols overhead and latency may be considered.

Example Downlink Coverage Enhancements

Various issues exist with DL coverage for low cost devices. For example, low cost UEs may have only 1 receive (Rx) antenna, thereby impacting DL coverage. DL coverage enhancements may also be desirable because a transmitting cell may use reduced transmission power (e.g., to reduce interference with other cells).

In LTE Rel-8, at least for large system bandwidths, a base station (eNB) may have the flexibility of using power control and/or resource control to manage DL coverage for a UE. A control channel for a coverage-limited UE may use a large aggregation level and can further be power boosted (potentially with some limitation), especially when there are very few simultaneous control channels transmissions in a given subframe. A data channel for a UE may have a low coding rate and can be power boosted (potentially with some limitation), as well, especially when PDSCH is narrow-band and there are very few simultaneous data transmissions in a given subframe.

Since coverage is typically UL limited, there may be no strong desire in some cases (e.g., LTE Rel-8) to standardize any DL coverage enhancements. However, in the future (e.g., in LTE Rel-12), DL coverage improvements may be much more desired. In such cases, a UE may have only 1 receive chain (versus 2), which may result in at least a 3 dB loss. A UE may also have narrowband operation, resulting in frequency diversity gain loss, limited power boosting possibility, and limited lowest possible coding rate.

Techniques presented herein, however, may provide for possible DL coverage enhancements. Such DL coverage enhancements may be made for transmitting downlink control channels (e.g., via reduced payload size, increased number of resources per subframe, TTI bundling over different subframes, and/or beamforming) and for transmitting downlink data channels (e.g., beamforming and/or TTI bundling over different subframes).

As outlined above, DL coverage enhancements may be utilized for transmitting various control channels. Such control channels include PBCH, Physical Control Format Indicator Channel (PCFICH) (or enhanced ePCFICH), PHICH (or enhanced ePHICH), PDCCH (or enhanced ePDCCH). For PBCH, coverage may be enhanced by reducing PBCH payload size (e.g., from a current 24 bits including 9 reserved bits, to a smaller number of bits).

For PCFICH or ePCFICH, DL coverage may be enhanced by increasing the number of resources such that the coding rate is reduced (e.g., increasing from 16 resource elements (REs) to 32 REs via simple repetition). A cell may support one or more (e)PCFICH configurations targeting different coverage and may indicate which one to use in a subframe. In some cases, there may be no support of dynamic control update (e.g., reducing/eliminating the desire for (e)PCFICH).

For PHICH or ePHICH, DL coverage may be enhanced by increasing the number of resources such that the coding rate is reduced (e.g., increased from 12 REs to 24 REs via simple repetition). A cell may support one or more (e)PHICH configurations targeting different coverage and may indicate (via signaling) which configuration to use in a subframe. In some cases, there may be no (e)PHICH-based UL HARQ operation.

For PDCCH and ePDCCH, DL coverage may be enhanced by payload size reduction. For example, more compact Downlink Control Information (DCI) formats may be introduced. It may be noted that the extent of payload size reduction may be different for broadcast and unicast control (e.g., the payload size reduction for broadcast may be less than the payload size reduction for unicast). In particular, a DCI scheduling broadcast may not be the same size as a DCI scheduling unicast, as in the Rel-8 case (DCI format 1A has the same size for broadcast and unicast in the common search space).

DL coverage for (e)PDCCH may also be enhanced by increasing resources. For example, for regular UEs, aggregation levels 1/2/4/8 are supported for PDCCH, corresponding to 36/72/144/288 resource elements, respectively. For coverage-limited UEs, a different set of aggregation levels for (e)PDCCH (e.g., 2/4/8/16) may be considered. However, this option may not be possible if the system bandwidth is small (e.g., 6 RBs), at least for PDCCH.

Coverage may also be enhanced by utilizing TTI bundling. For example, a single DCI may be transmitted over multiple subframes. The PDCCH carrying the same DCI in different subframes of the same bundle may use the same aggregation level. While it may be possible to have different levels (e.g., by radio resource control (RRC) configuration, or potentially combined with, say, subframe $id_x$), it may not be preferable due to complexity. The PDCCH in each subframe (of the bundle) may be individually coded, modulated, and mapped to resources, instead of jointly performed. It may be desirable, in some cases, to use the same modulation/coding rate (e.g., repetition over the subframes in the bundle). The Control Channel Element(s) (CCE(s)) in each subframe need not be the same, but it may be desirable that the CCE(s) be implicitly linked. For example, the same decoding candidate index may be used in the UE-specific search space, although the UE-specific search space can be subframe dependent.

In some cases, aggregation levels may be different in different subframes in the same bundle depending on resource availability. For example, the available resources for PDCCH or ePDCCH (based on subframe type, and/or indicated by PCFICH or ePCFICH) may be limited, and a UE starts with level 8 PDCCH or ePDCCH in a first subframe and may use level 4 in a second subframe in the same bundle if the second subframe has a resource availability limitation.

In some cases, a UE may perform early decoding when TTI bundling is used for DL coverage enhancement. For example, if a UE successfully decodes a PDCCH/ePDCCH/PDSCH before the last subframe in the bundle, the UE may skip decoding for the rest of subframes in the bundle (which may reduce power consumption at the UE).

It may be desirable not to increase the number of blind decodes when utilizing TTI bundling. For example, it may be possible to maintain the same number of blind decodes per subframe by having the UE monitor the same aggregation level and the same decoding candidate of the aggregation level over the subframes in the bundle for a DCI.

As an example, $\{L, k\}$ may be used to indicate a combination of aggregation level L and a decoding candidate k. Suppose there are aggregation levels $\{1, 2, 4\ 8\}$ with $\{6, 6, 2, 2\}$ decoding candidates, respectively, as in Rel-8 for PDCCH. For this example, the bundling size N may be assumed to be N=2. Then, the decoding candidates for a UE are $\{1, 1\}, \{1, 2\}, \ldots, \{1, 6\}, \{2, 1\}, \{2, 2\}, \ldots, \{2, 6\}, \{4, 1\}, \{4, 2\}, \{8, 1\}, \{8, 2\}$ for all subframes in the bundle. In other words, for a particular DCI, if it is transmitted using $\{8, 1\}$ in the first subframe in a bundle, the same $\{8, 1\}$ would be used in all the remaining subframes in the same bundle.

Additional flexibility may also be possible (e.g., via some implicit derivation), but eNB and UE should be aligned.

When utilizing TTI bundling, it may be desirable for a UE to know a "subframe offset," which indicates the subframe corresponding to a starting subframe in the bundle. In some cases, the starting subframe for a control channel in bundling can be hard-coded, semi-statically determined, or dynamically determined. Different control channel decoding candidates may have different subframe offset determination schemes. For example, the common search space may have a hard-coded scheme, while the UE-specific search space may have a semi-static scheme.

As outlined above, hard-coded subframe offsets may be utilized. For example, if the bundling size is 2, it can be specified that the bundling operation always starts from an even subframe for a cell. It may be further enhanced to have a cell-dependent offset (e.g., linked with the cell ID). As an example, based on cell ID, a cell may be determined to have even subframe offsets, while another cell may be determined to have odd subframe offsets. Semi-static subframe offsets may also be utilized, for example, via RRC configuration. Dynamic offsets may be, for example, indicated by other channels, linked with the frame index, blindly detected by the UE, or by some other mechanism.

A UE may most likely also be made aware of the TTI bundling size. The number of subframes can be fixed (e.g., 4), configurable (e.g., via RRC), or dynamic. Rate matching, scrambling, interleaving, and other such physical layer operations may be the same for the subframes in the same bundle, especially when the bundling size is dynamically determined. Alternatively, rate matching, scrambling, interleaving, or some other physical layer operations may be different for different subframes in the same bundle, especially when the bundling size is fixed or semi-statically configured.

UE decoding of the control channel with TTI bundling may vary depending on bundling parameters. The UE can perform control channel decoding every N (bundling size) subframes, especially when the subframe offset and/or bundling size is fixed or semi-statically determined. Alternatively, the UE may perform decoding of the control channel every single subframe, especially when the subframe offset and/or bundling size is dynamically determined. In some cases, the UE may try to first decode the current subframe and then to soft combine the current subframe with the previous one, etc. The UE may directly store the soft detection symbols (e.g., log-likelihood ratio, or LLR) from the previous subframe for redundancy combining. If the UE does not know the bundling size, it may not know the HARQ timing. To address this issue, the UE may be notified of the HARQ timing in the grants. As an example, if the bundle size is 2 subframes, one bit in the grant may be included to indicate whether the last subframe in a bundle is an even- or odd-numbered subframe. For blind decoding of the subframe offset and/or size for bundling, there may be ambiguity regarding the offset between the eNB and UE (e.g., a UE may determine an incorrect offset). This may be alleviated by modifying the control channel design (e.g., offset dependent rate matching, scrambling, interleaving, etc.) as discussed above.

In some cases, DL coverage may be enhanced by additional beamforming gain for a localized ePDCCH. More transmit (Tx) antennas (e.g., greater than 8) may also be considered. The same precoding for the ePDCCHs in different subframes of the same bundle may be used in an effort to improve ePDCCH channel estimation and decoding performance.

Different control channel decoding candidates may adopt different DL coverage enhancement techniques. For example, common search space control channel transmissions may rely on TTI bundling, distributed ePDCCH may also rely on TTI bundling, but localized ePDCCH may rely on beamforming.

Various techniques (described above and further described below) for enhancing DL coverage may also be applied for transmitting data channels.

In some cases, the PDSCH may be transmitted utilizing transmit diversity. Such transmissions may be broadcast or unicast. TTI bundling may be utilized when transmitting DL data. A single transport block (TB) may be transmitted over multiple subframes. The number of subframes may be fixed (e.g., 4), configurable (e.g., via RRC), or dynamically indicated via a control channel. The PDSCH in each subframe for the same TB may be individually coded, modulated, and mapped to resources, instead of jointly performed. For certain aspects, the same modulation and coding scheme (MCS) is used for the PDSCH in all the subframes of the same bundle (e.g., a simple repetition over different subframes). For other aspects, different MCSs may be used for the PDSCH in all subframes of the same bundle, where the various MCSs in different subframes of the same bundle are linked with each other. In other words, a UE may be informed of the MCS scheme for the first subframe of the bundle, and the UE may determine the MCSs for the remaining subframes of the bundle based on the MCS for the first subframe.

In some cases, the PDSCH carrying the same TB in different subframes may use the same amount of RBs, but the locations of the RBs need not be the same. This may depend on resource allocation types, whether hopping is enabled or not, and the like. However, for certain aspects, the locations of the RBs in the second and onward subframes may be implicitly derived based on the locations of the RBs in the first subframe of the same bundle.

Additional beamforming gain may also be utilized to enhance DL coverage for the PDSCH, for example. For certain aspects, the same precoding for the PDSCHs in the same bundle may be used in an effort to improve PDSCH channel estimation and decoding performance.

As described above for control channels, the subframe offset for PDSCH in bundling may be hard-coded, semi-statically determined, or dynamically determined. For example, different PDSCHs may have different subframe offset determination schemes (e.g., broadcast versus unicast).

In some cases, DL HARQ operation under TTI bundling may be adjusted for enhanced DL coverage. Scheduling timing (from (e)PDCCH to PDSCH) may be as with regular UEs: in the same subframe. For same subframe scheduling, the number of bundled subframes for control may be the same or less than that for data. This may be simple, but a UE would have to buffer for data before control can be decoded.

As an alternative, cross-subframe scheduling may be utilized (i.e., different subframes for control and data), which may relax buffering implications at the UE. As an example, a control channel may be transmitted in subframe n, while the corresponding data channel is transmitted in subframes n+1, n+2, n+3 and n+4.

In some cases, HARQ ACK timing (from PDSCH to ACK/NAK) may be adjusted for enhanced DL coverage. For regular UEs, the HARQ ACK timing can be 4 ms in FDD, and >4 ms in TDD. For coverage-limited UEs, the HARQ ACK/NAK timing may be linked with PDSCH of the last subframe in the bundle, regardless of whether PDSCH is transmitted in the last subframe or not (PDSCH may not be transmitted in some subframes, as described below). The timing may be the same as for regular UEs or may be relaxed (>4 ms).

The number of HARQ processes may also be adjusted, for example, depending on the bundling size, scheduling timing, and HARQ ACK timing. As an example, the number of HARQ processes may be determined by floor((scheduling delay+HARQ ACK delay)/bundling)+1. If scheduling delay is zero (i.e., same subframe scheduling) and HARQ ACK delay is 4 ms (for bundling size of 4), there may be up to 2 DL HARQ processes for the UE.

As an alternative, HARQ-less operation for bundled PDSCH transmissions may also be considered.

UL HARQ operation may also be considered under TTI bundling. The scheduling timing ((e)PDCCH to PUSCH) can be defined based on the last control subframe in the bundle to the first PUSCH subframe, regardless of whether the last control subframe transmits the control channel or not. The HARQ ACK timing (PUSCH to (e)PHICH and (e)PDCCH) can be defined based on the PUSCH subframe to the first control subframe in the bundle. The number of UL HARQ processes may also be reduced due to increased UL round-trip time (RTT) compared with the non-bundling case.

The interaction between control and data may also be considered when enhancing DL coverage. For example, DL TTI bundling may be enabled for control only, data only, or both. As an example, TTI bundling may be utilized for data only, but not for control. Instead, a different coverage enhancement technique can be adopted for a control channel, e.g., by increasing the number of resources used by the control channel. This approach is favorable, especially given the impact on UL HARQ operation.

The interaction with MBSFN subframes may also be considered when enhancing DL coverage. For example, the subframes in the bundle may be consecutive DL subframes. However, some subframes may not be available for PDSCH transmissions, for example, as with MBSFN subframes configured for multimedia broadcast and multicast service (MBMS) transmissions. In this case, PDSCH transmissions in these subframes can be omitted, such that the effective number of subframes in a bundle is reduced. Alternatively, the subframes in a bundle can be defined as consecutive and available DL subframes. With this approach, subframes not available for PDSCH may be excluded from bundling to ensure the actual number of PDSCH transmissions in a bundle is equal to the bundling size. However, this approach may complicate HARQ operation (which may lead to considering HARQ-less operation).

TDD-specific considerations may also be made when enhancing DL coverage. For example, TTI bundling may most likely be only over DL subframes (skipping UL subframes). Special subframes may be skipped, too, if the DwPTS length is too small to carry any PDSCH or ePD- CCH. For DwPTS in special subframes carrying PDSCH/ePDCCH, the number of available resources is typically less than that of regular DL subframes. To address this issue, two design alternatives may be considered. In a first alternative, the number of RBs (or resources) for PDSCH/ePDCCH in DwPTS is the same as that of the regular DL subframes in the same bundle. This may be simple, but performance may be degraded slightly. As a second alternative, the number of RBs (or resources) for PDSCH/ePDCCH in DwPTS may be adjusted compared with that of the regular DL subframes in the same bundle. This may be a bit more complicated, but may improve performance. In some cases, the adjustment factor can be based on the current transport block size (TBS) adjustment factor or can be newly defined. As an example, if the TBS adjustment factor is 0.75, the RB adjustment factor in DwPTS under DL TTI bundling can be ceiling (N_RB/0.75), where N_RB is the number of RBs in regular DL subframes of the same bundle.

Figure 5:
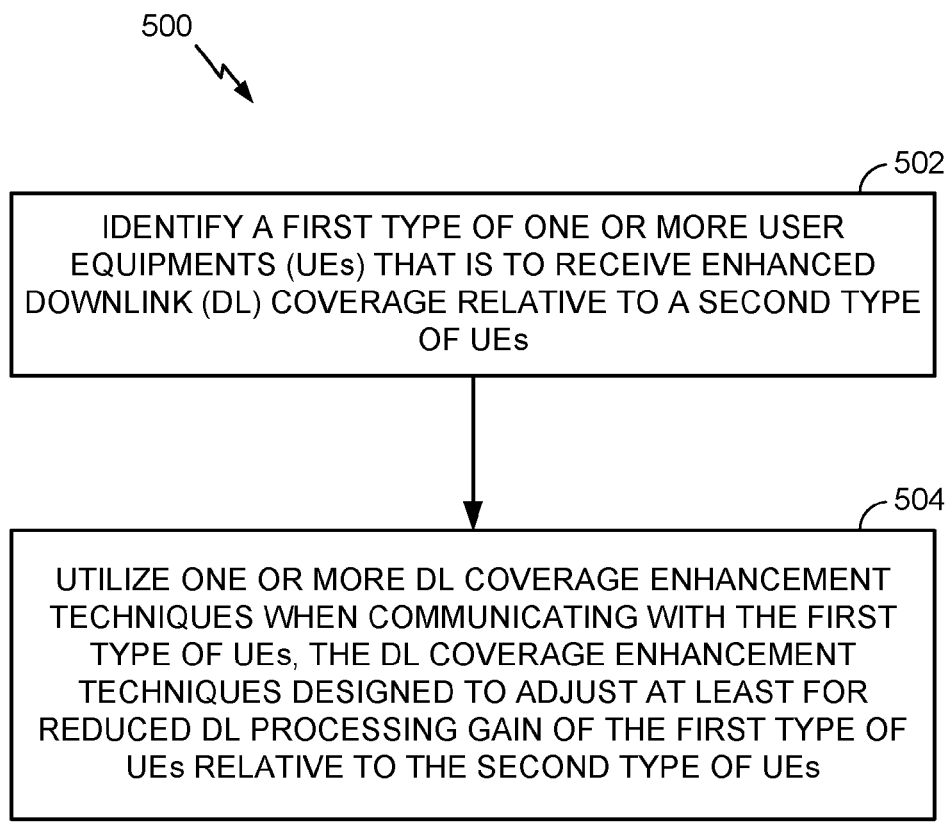
FIG. 5 illustrates example operations for enhanced downlink coverage that may be performed by a base station, in accordance with certain aspects of the present disclosure.

FIG. 5 illustrates example operations 500 for enhanced downlink coverage. The operations may be performed, for example, by a base station (e.g., an eNB 110).

The operations 500 may begin, at 502, with the base station identifying a first type of one or more user equipments (UEs) with limited downlink (DL) coverage—or that is to receive enhanced DL coverage—relative to a second type of UEs. At 504, the base station utilizes one or more DL coverage enhancement techniques when communicating with the first type of UEs, the DL coverage enhancement techniques designed to compensate (or at least adjust) at least for reduced DL processing gain of the first type of UEs relative to the second type of UEs. The reduced DL processing gain may be due to at least one of a reduced number of receive chains relative to the second type of UEs, reduced downlink transmission power, or narrower bandwidth operation relative to the second type of UEs.

According to certain aspects, the one or more DL coverage enhancement techniques involve reducing a payload size of one or more control channels when transmitting to the first type of UEs relative to a payload size of the same control channels when transmitting to the second type of UEs. For certain aspects, a first payload size is used when transmitting a unicast message of a first type of control channel, and a second payload size is used when transmitting a non-unicast message of the first type of control channel.

According to certain aspects, the one or more DL coverage enhancement techniques include increasing resources available for one or more control channels to support a reduced coding rate. The increase in resources may be relative to a number of resources available when transmitting the same control channels to the second type of UEs. For certain aspects, the same information is repeated in different sets of resource elements (REs) of the increased resources. For certain aspects, the operations 500 further includes the base station receiving signaling indicating one or more subframes in which a control channel is to be transmitted using the increased resources.

According to certain aspects, the one or more DL coverage enhancement techniques include transmission time interval (TTI) bundling, wherein redundant versions of a downlink channel are transmitted over a bundle of multiple DL subframes. For example, the bundle may include N consecutive DL subframes or N consecutive non-Multimedia Broadcast Single Frequency Network (non-MBSFN) DL subframes. For certain aspects, different numbers of resource blocks (RBs) are used to transmit the downlink channel for DL subframes in the bundle with and without a downlink pilot time slot (DwPTS). A same aggregation level may be used for transmitting the downlink channel in each subframe in the bundle. For other aspects, different aggregation levels may be used for transmitting the downlink channel in different subframes in the bundle. The aggregation level used in a subframe may be dependent on available resources in that subframe. For certain aspects, a version of the downlink channel in each subframe in the bundle is individually coded, modulated, and mapped to resources. For certain aspects, different sets of control channel elements (CCEs) are used to transmit versions of the downlink channel in different subframes, and locations of the different sets of CCEs in the different subframes are linked. For certain aspects, a scheduling timing between a control channel and a corresponding physical downlink shared channel (PDSCH) transmitted via the TTI bundling is determined based on a first subframe in the bundle. According to certain aspects, a hybrid automatic repeat request (HARQ) timing between a physical downlink shared channel (PDSCH) transmitted via the TTI bundling and a corresponding HARQ response is determined based on a last subframe in the bundle. A number of hybrid automatic repeat request (HARQ) processes supported may be dependent on a TTI bundling size. For certain aspects, a same decoding candidate is used for transmitting the downlink channel in each subframe in the bundle.

The downlink channel may be a physical downlink shared channel (PDSCH). According to certain aspects, the TTI bundling involves transmitting a single transport block (TB) over multiple subframes. For certain aspects, the TB is transmitted in each subframe of the bundle using a same modulation and coding scheme (MCS). For certain aspects, the TB is transmitted in each subframe of the bundle using a same number of resource blocks (RBs). The TB may be transmitted in each subframe of the bundle using different locations of resource blocks (RBs).

According to certain aspects, a subframe offset for a starting subframe in the bundle is determined at least one of semi-statically or dynamically. The subframe offset for the starting subframe in the bundle may be cell-dependent.

For certain aspects, a size of the bundle is at least one of fixed or semi-statically configured. One or more physical layer (PHY) operations for transmitting a version of the downlink channel may vary in different subframes in the bundle. For other aspects, a size of the bundle is dynamically configured. One or more physical layer (PHY) operations for transmitting a version of the downlink channel may be the same in different subframes in the bundle.

According to certain aspects, utilizing the one or more DL coverage enhancement techniques at 504 includes utilizing a first technique for a control channel and utilizing a second technique for a data channel for the first type of UEs.

For certain aspects, cross-subframe scheduling is utilized, such that a control channel sent in a first subframe schedules a data transmission in a subsequent subframe.

According to certain aspects, the one or more DL coverage enhancement techniques include utilizing additional beamforming gain.

According to certain aspects, different DL coverage enhancement techniques are used for DL channels transmitted in different decoding candidates.

Figure 6:
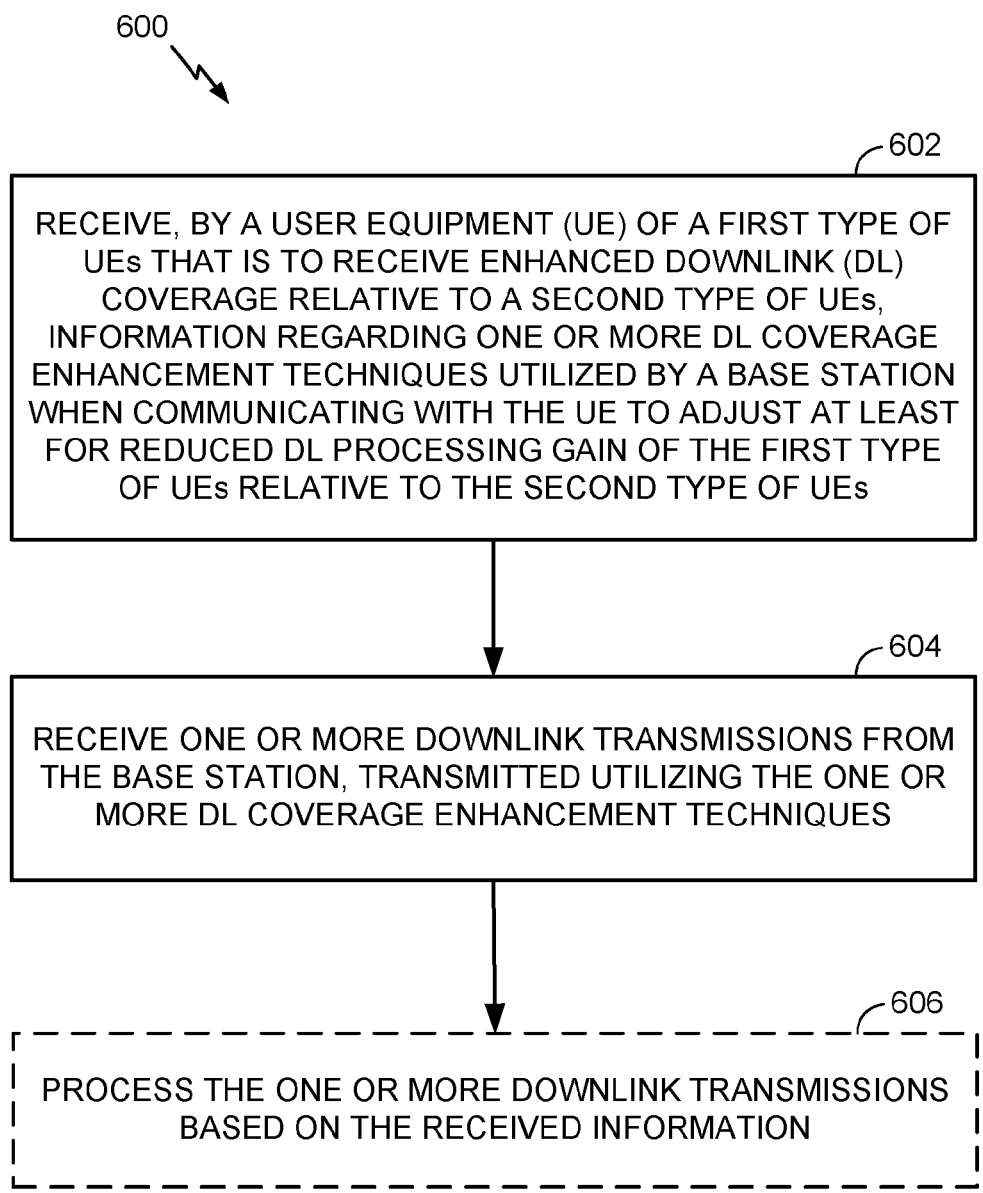
FIG. 6 illustrates example operations for enhanced downlink coverage that may be performed by a UE, in accordance with certain aspects of the present disclosure.

FIG. 6 illustrates example operations 600 for enhanced downlink coverage. The operations may be performed, for example, by a UE 120.

The operations 600 may begin, at 602, with the UE, which is of a first type of UEs with limited DL coverage—or that is to receive enhanced DL coverage—relative to a second type of UEs, receiving information regarding one or more DL coverage enhancement techniques utilized by a base station when communicating with the UE to compensate (or at least adjust) at least for reduced DL processing gain of the first type of UEs relative to the second type of UEs. For certain aspects, the reduced DL processing gain is due to at least one of a reduced number of receive chains relative to the second type of UEs, reduced downlink transmission power, or narrower bandwidth operation relative to the second type of UEs.

At 604, the UE receives one or more downlink transmissions from the base station, transmitted utilizing the one or more DL coverage enhancement techniques. At 606, the UE may process the one or more downlink transmissions based on the received information.

According to certain aspects, the one or more DL coverage enhancement techniques include reducing a payload size of one or more control channels when transmitting to the first type of UEs relative to a payload size of the same control channels when transmitting to the second type of UEs. For certain aspects, a first payload size is used when transmitting a unicast message of a first type of control channel, and a second payload size is used when transmitting a non-unicast message of the first type of control channel.

According to certain aspects, the one or more DL coverage enhancement techniques include increasing resources available for one or more control channels to support a reduced coding rate. For certain aspects, the increase in resources is relative to a number of resources available when transmitting the same control channels to the second type of UEs. For certain aspects, the same information is repeated in different sets of REs of the increased resources.

According to certain aspects, the one or more DL coverage enhancement techniques include TTI bundling, wherein the one or more downlink transmissions include redundant versions of a downlink channel transmitted over a bundle of multiple DL subframes. The bundle may comprise N consecutive DL subframes or N consecutive non-MB SFN DL subframes, for example. For certain aspects, different numbers of RBs are used to transmit the downlink channel for DL subframes in the bundle with and without a DwPTS. The downlink channel may be transmitted using a same aggregation level in each subframe in the bundle or using different aggregation levels in different subframes in the bundle. In the latter case, the aggregation level used in a subframe may be dependent on available resources in that subframe. For certain aspects, a version of the downlink channel in each subframe in the bundle is individually coded, modulated, and mapped to resources. For certain aspects, different sets of CCEs may be used to transmit versions of the downlink channel in different subframes, and locations of the different sets of CCEs in the different subframes may be linked.

According to certain aspects, the downlink channel is a PDSCH. In this case, the TTI bundling may involve transmitting a single TB over multiple subframes. For certain aspects, the TB is transmitted in each subframe of the bundle using at least one of a same MCS, a same number of RBs, or different locations of the RBs.

For certain aspects, a scheduling timing between a control channel and a corresponding PDSCH transmitted via the TTI bundling is determined based on a first subframe in the bundle. For certain aspects, a HARQ timing between a PDSCH transmitted via the TTI bundling and a corresponding HARQ response is determined based on a last subframe in the bundle. For certain aspects, a number of HARQ processes supported is dependent on a TTI bundling size.

According to certain aspects, if the UE successfully decodes the downlink channel before the last subframe in the bundle, the UE may skip decoding the downlink channel for remaining subframes in the bundle. For certain aspects, a same decoding candidate is used for transmitting the downlink channel in each subframe in the bundle. A size of the bundle may be at least one of fixed or semi-statically configured. For certain aspects, one or more physical layer (PHY) operations for transmitting a version of the downlink channel vary in different subframes in the bundle. The size of the bundle may be dynamically configured. For certain aspects, one or more PHY operations for transmitting a version of the downlink channel are the same in different subframes in the bundle.

According to certain aspects, a subframe offset for a starting subframe in the bundle is determined at least one of semi-statically or dynamically. The subframe offset for the starting subframe in the bundle may be cell-dependent.

According to certain aspects, the one or more DL coverage enhancement techniques include utilizing a first technique for a control channel and utilizing a second technique for a data channel for the first type of UEs.

According to certain aspects, cross-subframe scheduling is utilized, such that a control channel sent in a first subframe schedules a data transmission in a subsequent subframe.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in the Figures, those operations may be performed by any suitable corresponding counterpart means-plus-function components.

For example, means for transmitting may comprise a transmitter (e.g., a modulator 232) and/or an antenna 234 of the eNB 110 illustrated in FIG. 2. Means for receiving may comprise a receiver (e.g., a demodulator 232) and/or an antenna 234 of the eNB 110 illustrated in FIG. 2. Means for processing, means for utilizing one or more DL coverage enhancement techniques, means for identifying, or means for determining may comprise a processing system, which may include at least one processor, such as the receive processor 238, the controller/processor 240, and/or the transmit processor 220 of the eNB 110 illustrated in FIG. 2. However, additional or alternative components in FIG. 2 may be employed as the various means described above.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

As used herein, a phrase referring to "at least one of" a list of items refers to any combination of those items, including single members. As an example, "at least one of a, b, or c" is intended to cover a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE) of a first type of UEs, comprising: receiving information regarding one or more downlink (DL) coverage enhancement techniques utilized by a base station when communicating with the UE to adjust at least for reduced DL processing gain of the first type of UEs relative to a second type of UEs;
receiving one or more DL transmissions from the base station transmitted using the one or more DL coverage enhancement techniques; and
processing the one or more received DL transmissions based on the received information.

2. The method of claim 1, wherein the reduced DL processing gain is due to at least one of: a reduced number of receive chains relative to the second type of UEs;
reduced downlink transmission power; or
narrower bandwidth operation relative to the second type of UEs.

3. The method of claim 1, wherein the one or more DL coverage enhancement techniques comprise receiving a reduced payload size of one or more control channels at the first type of UEs relative to a payload size of the same control channels received at the second type of UEs.

4. The method of claim 3, wherein: a first payload size is used for a unicast message of a first type of control channel; and a second payload size is used for a non-unicast message of the first type of control channel.

5. The method of claim 1, wherein the one or more DL coverage enhancement techniques comprise an increased amount of resource availability for one or more control channels to support a reduced coding rate.

6. The method of claim 5, wherein the increased amount of resource availability is relative to a number of resources available for receiving the same control channels at the second type of UEs.

7. The method of claim 5, wherein the same information is repeated in different sets of resource elements (REs) in the increased amount of resource availability.

8. The method of claim 5, further comprising transmitting, to the base station, signaling indicating one or more subframes in which a control channel is to be transmitted using the increased amount of resources.

9. The method of claim 1, wherein the one or more DL coverage enhancement techniques comprise transmission time interval (TTI) bundling wherein redundant versions of a downlink channel are received in a bundle of multiple DL subframes.

10. The method of claim 9, wherein the bundle comprises N consecutive DL subframes.

11. The method of claim 9, wherein the bundle comprises N consecutive non-Multimedia Broadcast Single Frequency Network (non-MBSFN) DL subframes.

12. The method of claim 9, wherein DL subframes in the bundle with and without a downlink pilot time slot (DwPTS) are received on different numbers of resource blocks (RBs).

13. The method of claim 9, wherein the downlink channel comprises a physical downlink shared channel (PDSCH).

14. The method of claim 13, wherein the TTI bundling comprises receiving a single transport block (TB) over multiple subframes.

15. The method of claim 14, wherein the TB is received in each subframe of the bundle using a same modulation and coding scheme (MCS).

16. The method of claim 14, wherein the TB is received in each subframe of the bundle using a same number of resource blocks (RBs).

17. The method of claim 1, wherein the one or more downlink coverage enhancement techniques comprise receiving versions of the downlink channel in different subframes using different sets of control channel elements (CCEs), and wherein the locations of the different sets of CCEs in the different subframes are linked.

18. The method of claim 17, wherein the TB is received in each subframe of the bundle using different locations of resource blocks (RBs).

19. The method of claim 9, wherein a scheduling timing between a control channel and a corresponding physical downlink shared channel (PDSCH) transmitted via the TTI bundling is determined based on a first subframe in the bundle.

20. The method of claim 9, wherein a hybrid automatic repeat request (HARQ) timing between a physical downlink shared channel (PDSCH) transmitted via the TTI bundling and a corresponding HARQ response is determined based on a last subframe in the bundle.

21. The method of claim 9, wherein a number of hybrid automatic repeat request (HARQ) processes supported is dependent on a TTI bundling size.

22. The method of claim 1, wherein the one or more DL coverage enhancement techniques comprise receiving the downlink channel in each subframe in a bundle of subframes using a same aggregation level.

23. The method of claim 1, wherein the one or more DL coverage enhancement techniques comprise receiving the downlink channel in different subframes in a bundle of subframes using a different aggregation level.

24. The method of claim 23, wherein an aggregation level used in a subframe is dependent on available resources in that subframe.

25. The method of claim 1, wherein the one or more DL coverage enhancement techniques comprise receiving the downlink channel in a bundle of subframes, and wherein a version of the downlink channel in each subframe in the bundle is individually coded, modulated, and mapped to resources.

26. The method of claim 1, wherein the one or more downlink coverage enhancement techniques comprise receiving versions of the downlink channel in different subframes using different sets of control channel elements (CCEs), and wherein the locations of the different sets of CCEs in the different subframes are linked.

27. The method of claim 1, wherein the one or more DL coverage enhancement techniques comprise receiving the same decoding candidate for the downlink channel in each subframe in a bundle of subframes.

28. The method of claim 1, wherein the one or more DL coverage enhancement techniques comprise receiving the DL channel in a bundle of subframes, and wherein a subframe offset for a starting subframe in the bundle is determined at least one of semi-statically or dynamically.

29. The method of claim 28, wherein the subframe offset for the starting subframe in the bundle is cell-dependent.

30. The method of claim 1, wherein the one or more coverage enhancement techniques comprises receiving the DL channel in a bundle of subframes, and wherein a size of the bundle is at least one of fixed or semi-statically configured.

31. The method of claim 1, wherein the one or more DL coverage enhancement techniques comprise receiving the downlink channel in a bundle of subframes, and wherein one or more physical layer (PHY) operations for receiving a version of the downlink channel vary in different subframes in the bundle.

32. The method of claim 1, wherein the one or more DL coverage enhancement techniques comprise receiving the downlink channel in a bundle of subframes, and wherein a size of the bundle is dynamically configured.

33. The method of claim 1, wherein the one or more DL coverage enhancement techniques comprise receiving the downlink channel in a bundle of subframes, and wherein one or more physical layer (PHY) operations for receiving a version of the downlink channel are the same in different subframes in the bundle.

34. The method of claim 1, wherein a control channel is received using a first technique and a data channel is received using a second technique for the first type of UEs.

35. The method of claim 1, wherein cross-subframe scheduling is utilized, such that a control channel received in a first subframe schedules a data transmission by the UE in a subsequent subframe.

36. The method of claim 1, wherein the one or more DL coverage enhancement techniques comprise utilizing additional beamforming gain.

37. The method of claim 1, wherein different DL coverage enhancement techniques are used for DL channels received in different decoding candidates.

38. An apparatus for wireless communications by a user equipment (UE) of a first type of UEs, comprising: a processor configured to:
receive information regarding one or more downlink (DL) coverage enhancement techniques utilized by a base station when communicating with the UE to adjust at least for reduced DL processing gain of the first type of UEs relative to a second type of UEs;
receive one or more DL transmissions from the base station transmitted using the one or more DL coverage enhancement techniques; and process the one or more received DL transmissions based on the received information; and a memory coupled to the processor.

39. The apparatus of claim 38, wherein the one or more DL coverage enhancement techniques comprise receiving a reduced payload size of one or more control channels at the first type of UEs relative to a payload size of the same control channels received at the second type of UEs.

40. The apparatus of claim 38, wherein the one or more DL coverage enhancement techniques comprise an increased amount of resource availability for one or more control channels to support a reduced coding rate.

41. The apparatus of claim 38, wherein the one or more DL coverage enhancement techniques comprise transmission time interval (TTI) bundling wherein redundant versions of a downlink channel are received in a bundle of multiple DL subframes.

42. The apparatus or claim 38, wherein the one or more DL coverage enhancement techniques comprise receiving the downlink channel in each subframe in a bundle of subframes using a same aggregation level.

43. The apparatus of claim 38, wherein the one or more DL coverage enhancement techniques comprise receiving the downlink channel in different subframes in a bundle of subframes using a different aggregation level.

44. The apparatus of claim 38, wherein the one or more DL coverage enhancement techniques comprise receiving the downlink channel in a bundle of subframes, and wherein a version of the downlink channel in each subframe in the bundle is individually coded, modulated, and mapped to resources.

45. The apparatus of claim 38, wherein the one or more downlink coverage enhancement techniques comprise receiving versions of the downlink channel in different subframes using different sets of control channel elements (CCEs), and wherein the locations of the different sets of CCEs in the different subframes are linked.

46. The apparatus of claim 38, wherein the one or more DL coverage enhancement techniques comprise receiving the same decoding candidate for the downlink channel in each subframe in a bundle of subframes.

47. The apparatus of claim 38, wherein the one or more DL coverage enhancement techniques comprise receiving the DL channel in a bundle of subframes, and wherein a subframe offset for a starting subframe in the bundle is determined at least one of semi-statically or dynamically.

48. The apparatus of claim 38, wherein the one or more coverage enhancement techniques comprises receiving the DL channel in a bundle of subframes, and wherein a size of the bundle is at least one of fixed or semi-statically configured.

49. The apparatus of claim 38, wherein the one or more DL coverage enhancement techniques comprise receiving the downlink channel in a bundle of subframes, and wherein one or more physical layer (PHY) operations for receiving a version of the downlink channel vary in different subframes in the bundle.

50. The apparatus of claim 38, wherein the one or more DL coverage enhancement techniques comprise receiving the downlink channel in a bundle of subframes, and wherein a size of the bundle is dynamically configured.

51. The apparatus or claim 38, wherein the one or more DL coverage enhancement techniques comprise receiving the downlink channel in a bundle of subframes, and wherein one or more physical layer (PHY) operations for receiving a version of the downlink channel are the same in different subframes in the bundle.

52. The apparatus or claim 38, wherein the one or more DL coverage enhancement techniques comprise utilizing additional beamforming gain.

53. The apparatus of claim 38, wherein different DL coverage enhancement techniques are used for DL channels received in different decoding candidates.

54. An apparatus for wireless communications by a user equipment (UE) of a first type of UEs comprising: a processor,
wherein the processor configured to: receive information regarding one or more downlink (DL) coverage enhancement techniques utilized by a base station when communicating with the UE to adjust at least for reduced DL processing gain of the first type of UEs relative to a second type of UEs;
receive one or more DL transmissions from the base station transmitted using the one or more DL coverage enhancement techniques; and
process the one or more received DL transmissions based on the received information.

55. A non-transitory computer readable storage medium for wireless communications having instructions stored thereon for:
receiving information regarding one or more downlink (DL) coverage enhancement techniques utilized by a base station when communicating with the UE to adjust at least for reduced DL processing gain of the first type of UEs relative to a second type of UEs;
receiving one or more DL transmissions from the base station transmitted using the one or more DL coverage enhancement techniques; and
processing the one or more received DL transmissions based on the received information.

56. The apparatus of claim 54, wherein the reduced DL processing gain is due to at least one of:
a reduced number of receive chains relative to the second type of UEs;
reduced downlink transmission power; or
narrower bandwidth operation relative to the second type of UEs.

57. The apparatus of claim 54, wherein the one or more DL coverage enhancement techniques comprise receiving a reduced payload size of one or more control channels at the first type of UEs relative to a payload size of the same control channels received at the second type of UEs.

58. The computer-readable medium of claim 55, wherein the one or more DL coverage enhancement techniques comprise receiving a reduced payload size of one or more control channels at the first type of UEs relative to a payload size of the same control channels received at the second type of UEs.

59. The computer-readable medium of claim 58, wherein the reduced DL processing gain is due to at least one of:
a reduced number of receive chains relative to the second type of UEs;
reduced downlink transmission power; or
narrower bandwidth operation relative to the second type of UEs.

* * * * *

UNITED STATES PATENT AND TRADEMARK OFFICE
CERTIFICATE OF CORRECTION

PATENT NO. : 9,894,647 B2
APPLICATION NO. : 15/494457
DATED : February 13, 2018
INVENTOR(S) : Wanshi Chen et al.

It is certified that error appears in the above-identified patent and that said Letters Patent is hereby corrected as shown below:

In the Claims

Claim 54 should read as follows:
54. An apparatus for wireless communications by a user equipment (UE) of a first type of UEs, comprising:
    means for receiving information regarding one or more downlink (DL) coverage enhancement techniques utilized by a base station when communicating with the UE to adjust at least for reduced DL processing gain of the first type of UEs relative to a second type of UEs;
    means for receiving one or more DL transmissions from the base station transmitted using the one or more DL coverage enhancement techniques; and
    means for processing the one or more received DL transmissions based on the received information.

Signed and Sealed this
Twenty-ninth Day of May, 2018

Andrei Iancu
*Director of the United States Patent and Trademark Office*